(12) United States Patent
Shubel

(10) Patent No.: US 8,751,715 B1
(45) Date of Patent: Jun. 10, 2014

(54) SYSTEM AND METHOD FOR CONTROLLING DEVICE ACCESS

(75) Inventor: Paul Anton Shubel, East Greenwich, RI (US)

(73) Assignee: ENC Corporation, Hopkinton, MA (US)

( * ) Notice: Subject to any disclaimer, the term of this patent is extended or adjusted under 35 U.S.C. 154(b) by 280 days.

(21) Appl. No.: 12/751,799

(22) Filed: Mar. 31, 2010

(51) Int. Cl.
*G06F 13/00* (2006.01)

(52) U.S. Cl.
USPC ............ 710/110; 718/104; 710/240; 710/200

(58) Field of Classification Search
USPC ................. 710/110, 100, 200, 240–244, 311; 718/104
See application file for complete search history.

(56) References Cited

U.S. PATENT DOCUMENTS

| | | | | |
|---|---|---|---|---|
| 5,257,356 A | * | 10/1993 | Brockmann et al. | 710/110 |
| 5,544,332 A | * | 8/1996 | Chen | 710/108 |
| 5,682,551 A | * | 10/1997 | Pawlowski et al. | 710/36 |
| 5,862,353 A | * | 1/1999 | Revilla et al. | 710/107 |
| 6,728,808 B1 | * | 4/2004 | Brown | 710/107 |
| 7,281,070 B2 | * | 10/2007 | Bomhoff et al. | 710/110 |
| 8,171,448 B2 | * | 5/2012 | Johns et al. | 716/136 |

* cited by examiner

*Primary Examiner* — Tim T Vo
*Assistant Examiner* — Kim Huynh
(74) *Attorney, Agent, or Firm* — Brian J. Colandreo; Mark H. Whittenberger; Holland & Knight LLP

(57) ABSTRACT

A system, computer-implemented method, and a computer program product for regulating control of a slave device on a communications bus includes monitoring for a request for control of the slave device by a master device. Control of the slave device is granted to the master device. Control of the slave device is relinquished by the master device after the occurrence of a relinquishment event.

18 Claims, 4 Drawing Sheets

SYSTEM AND METHOD FOR CONTROLLING DEVICE ACCESS

TECHNICAL FIELD

This disclosure relates to device access and, more particularly, to device access within a communication bus.

BACKGROUND

Data buses allow for a plurality of devices to communicate with each other. Additionally, devices connected via a data bus are often of varying levels of importance. For example, devices are often classified into master devices and slave devices, wherein the master devices may assert control over the slave devices.

Unfortunately, situations may arise in which two master devices simultaneously (or quasi-simultaneously) try to control a single slave device, often resulting in data loss that complicates proper operation of the slave device.

SUMMARY OF DISCLOSURE

In one implementation, a method of regulating control of a slave device on a communications bus includes monitoring for a request for control of the slave device by a master device. Control of the slave device is granted to the master device. Control of the slave device is relinquished by the master device after the occurrence of a relinquishment event.

One or more of the following features may be included. The relinquishment event may be an expiry of a control timer. The control timer may be set to a defined period of time. The control timer may be repeatedly decremented until the expiry of the control timer. The relinquishment event may be a return of a control semaphore. Granting control of the slave device to the master device may include the granting of a control semaphore. The communications bus may be an I²C bus. The slave device and the master device may be I²C devices.

In another implementation, a computer program product resides on a computer readable medium having a plurality of instructions stored on it. When executed by a processor, the instructions cause the processor to perform operations including monitoring for a request for control of a slave device by a master device on a communications bus. Control of the slave device is granted to the master device. Control of the slave device is relinquished by the master device after the occurrence of a relinquishment event.

One or more of the following features may be included. The relinquishment event may be an expiry of a control timer. The control timer may be set to a defined period of time. The control timer may be repeatedly decremented until the expiry of the control timer. The relinquishment event may be a return of a control semaphore. Granting control of the slave device to the master device may include the granting of a control semaphore. The communications bus may be an I²C bus. The slave device and the master device may be I²C devices.

In another implementation, a system includes at least one processor, and at least one memory architecture coupled with the at least one processor. A first software module is executed on the at least one processor and the at least one memory architecture. The first software module is configured to monitor for a request for control of a slave device by a master device on a communications bus. A second software module is executed on the at least one processor and the at least one memory architecture. The second software module is configured to grant control of the slave device to the master device. A third software module is executed on the at least one processor and the at least one memory architecture. The third software module is configured to relinquish control of the slave device by the master device after the occurrence of a relinquishment event.

One or more of the following features may be included. The relinquishment event may be an expiry of a control timer. The control timer may be set to a defined period of time. The control timer may be repeatedly decremented until the expiry of the control timer. The relinquishment event may be a return of a control semaphore. Granting control of the slave device to the master device may includes the granting of a control semaphore. The communications bus may be an I²C bus. The slave device and the master device may be I²C devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
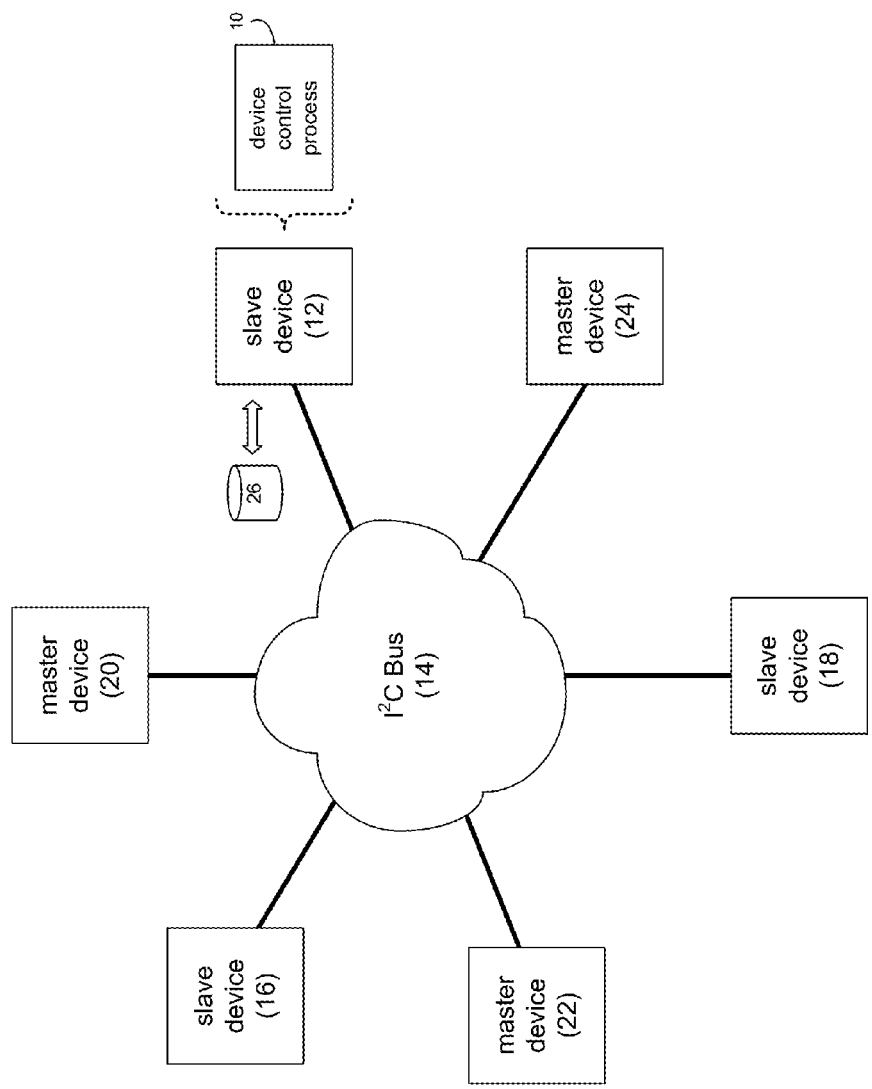
FIG. 1 is a diagrammatic view of various devices coupled to a data bus.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown device control process 10 that may be used to regulate access to and control of a device (e.g., slave device 12) coupled to a data communication bus (e.g., I²C bus 14). Communication bus 14 may allow for the coupling of a plurality of devices (e.g., various I²C devices), such as slave devices 12, 16, 18 and master devices 20, 22, 24. Examples of devices 12, 16, 18, 20, 22, 24 may include but are not limited to: analog-to-digital convertors; parallel bus controllers; repeaters, hubs & extenders; EEPROM-based DIP switches; LED dimmers/blinkers; general purpose 10 expanders; multiplexers & switches; real-time clocks; LCD drivers; serial EEPROMs; temperature & voltage sensors; power supplies; and voltage level translators. While this list of devices is intended to be illustrative, it is not intended to be all inclusive, as other configurations are possible and are considered to be within the scope of this disclosure.

Figure 2:
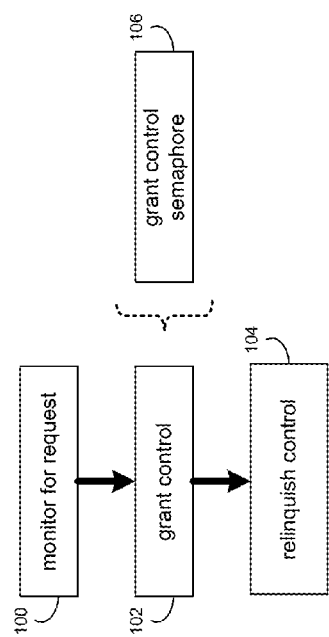
FIG. 2 is a flowchart of a device control process that may control access to one or more of the devices coupled to the data bus of FIG. 1.

Referring also to FIG. 2 and as will be discussed below in greater detail, device control process 10 may regulate control of a slave device (e.g., slave device 12) on a communications bus (e.g., communications bus 14). Device control process 10 may monitor 100 for a request for control of the slave device (e.g., slave device 12) by a master device (e.g., master device 20). Device control process 10 may grant 102 control of the slave device (e.g., slave device 12) to the master device (e.g., master device 20). Device control process 10 may relinquish control 104 of the slave device (e.g., slave device 12) by the master device (e.g., master device 20) after the occurrence of a relinquishment event.

The instruction sets and subroutines of device control process 10, which may be stored on storage device 26 coupled to slave device 12, may be executed by one or more processors (not shown) and one or more memory architectures (not shown) incorporated into slave device 12. Examples of storage device 26 may include but are not limited to: a hard disk drive; a tape drive; an optical drive; a RAID array; a random access memory (RAM); and a read-only memory (ROM).

While device control 10 is shown as being resident on and executed by slave device 12, this is for illustrative purposes only and is not considered to be a limitation of this disclosure, as other configurations are possible. For example, device control process 10 may be executed on any of slave devices 12, 16, 18. Alternatively/additionally, device control process 10 may be executed on any of master devices 20, 22, 24.

As discussed above, device control process 10 may regulate control of a slave device (e.g., slave device 12) on a communications bus (e.g., communications bus 14). Device control process 10 may monitor 100 for a request for control of the slave device (e.g., slave device 12) by a master device (e.g., master device 20).

Figure 3:
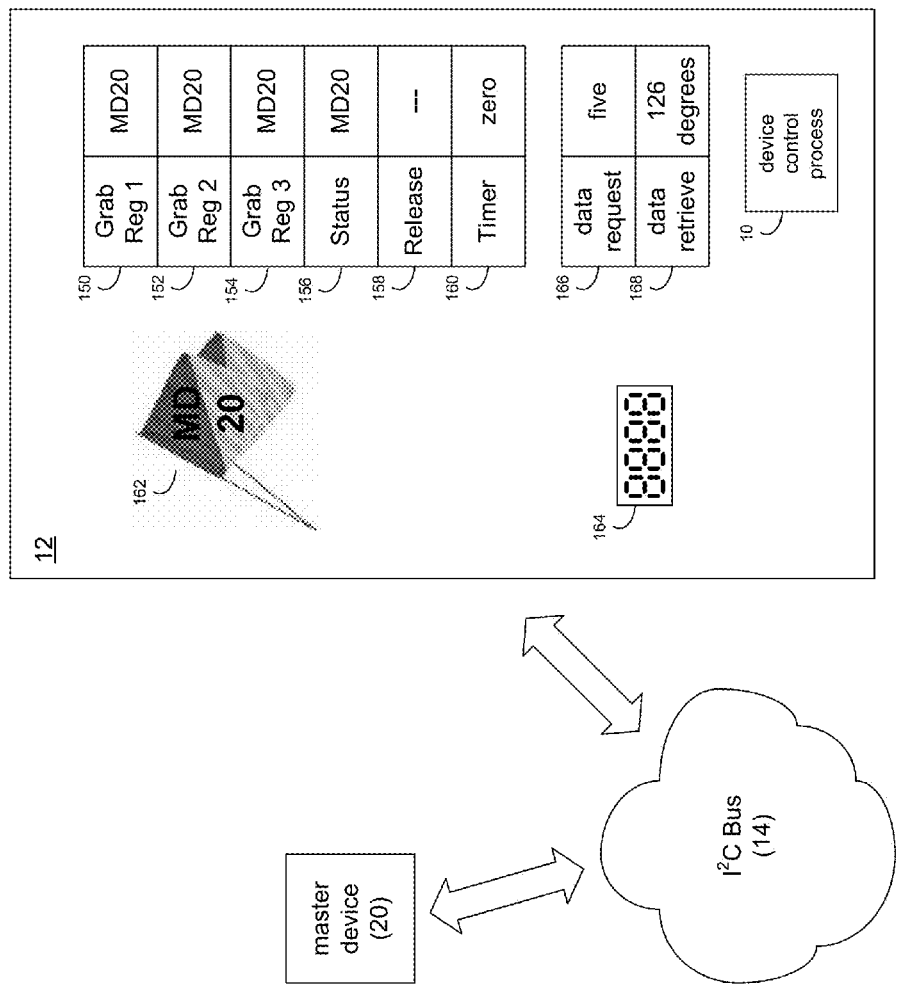
FIG. 3 is a diagrammatic view of a slave device implementing device control functionality coupled to the data bus of FIG. 1.

For example and referring also to FIG. 3, assume for illustrative purposes that slave device 12 may be controlled by any of master devices 20, 22, 24. Device control process 10 may establish a plurality of registers within slave device 12. In this particular example, six (6) registers were established, namely a read-only grab semaphore register (e.g., register 150) associated with master device 20; a read-only grab semaphore register (e.g., register 152) associated with master device 22; a read-only grab semaphore register (e.g., register 154) associated with master device 24; a read-only semaphore status register (e.g., register 156) that defines the status of a semaphore associated with slave device 12; a write-only release semaphore register (e.g., register 158) that effectuates the release of the semaphore associated with slave device 12; and a read-only semaphore timer register (e.g., register 160) that defines the status a control timer associated with slave device 12.

When any of master devices 20, 22, 24 requests control of slave device 12, the master device trying to gain control of the slave device may read the grab semaphore register associated with the requesting master device. Continuing with the above-stated example in which master device 20 requests control of slave device 12, master device 20 may effectuate this request by reading grab semaphore register 150 (i.e., the grab register associated with master device 20).

As discussed above, device control process 10 may monitor 100 for the occurrence of such requests for control of slave device 12 by e.g., master device 20. Upon detecting the occurrence of such a request, device control process 10 may determine the current control status of (in this example) slave device 12.

In the event that slave device 12 is currently being controlled by a master device (and therefore unavailable for control by master device 20), device control process 10 may populate grab register 150 (i.e., the grab register associated with requesting master device 20) with the identity code of the master device that is currently controlling slave device 12. In this particular example, there are three master devices (namely master devices 20, 22, 24). Accordingly, in the event that slave device 12 is unavailable for control by master device 20, one of master devices 22, 24 may be controlling slave device 12. Accordingly, device control process 10 may (in response to the read request of grab register 150) provide master device 20 with the identity of the master device controlling slave register 12 (namely master device 22 or master device 24).

In the event that slave device 12 is currently available for control by master device 12, device control process 10 may grant 102 control of slave device 12 to master device 20. For example, device control process 10 may update the value of grab semaphore register 150 (which would initially be a binary zero at the time of the request) to reflect the identity of master device 20. When device control process 10 grants 102 control of slave device 12 to master device 20, device control process 10 may grant 106 control semaphore 162 to master device 20. When device control process 10 grants 106 control semaphore 162 to master device 20, master device 20 now controls (and has exclusive access to) slave device 12. Accordingly and for a defined period of time, master devices 22, 24 are incapable of controlling slave device 12.

Device control process 10 may relinquish control 104 of the slave device (e.g., slave device 12) by the master device (e.g., master device 20) after the occurrence of a relinquishment event. Examples of such relinquishment events may include but are not limited to: the return of control semaphore 162 by (in this example) master device 20 (e.g., when master device 20 no longer needs/desires control of slave device 12); or the expiry of control timer 164. As will be discussed below in greater detail, the use of control timer 164 may prevent a failed master device from indefinitely retaining semaphore 162 (and, therefore, control of slave device 12).

Control timer 164 may be implemented by device control process 10 in various ways, all of which are considered to be within the scope of this disclosure. For example, device control process 10 may set control timer 164 for a defined period of time (e.g., 1,000 milliseconds) or a defined numeric value (e.g., 65,535) and control timer 164 may be repeatedly decremented by device control process 10 until the expiry of control timer 164. At this point, device control process 10 may allow another master device to obtain control of slave device 12 and grab semaphore 162. Additionally/alternatively, device control process 10 may initially set the value of control timer 164 to zero and control timer 164 may be repeatedly incremented by device control process 10 until achieving a limit (e.g., 1,000 milliseconds) or a defined numeric value (e.g., 65,535). At this point, device control process 10 may allow another master device to obtain control of slave device 12 and grab semaphore 162. The initial or final value of control timer 164 may be governed by the physical makeup of the timer. For example, a sixteen-bit timer may have a maximum value of 65,535.

Continuing with the above-stated example in which slave device 12 is currently available for control by master device 12, device control process 10 may grant 102 control of slave device 12 to master device 20. Further, device control process 10 may update the value of grab semaphore register 150 (which would initially be a binary zero at the time of the request) to reflect the identity of master device 20 (e.g., "MD20"). Additionally, device control process 10 may update grab semaphore register 152, 154 (associated with master devices 22, 24 respectively) to reflect the identity of master device 20 (e.g., "MD20").

As discussed above, when any of master devices 20, 22, 24 requests control of slave device 12, the master device trying to gain control of the slave device may read the grab semaphore register associated with the requesting master device. Accordingly, in the event that either of master devices 22, 24 requests control of slave device 12 (while master device 20 is controlling slave device 12), upon reading the appropriate grab register (namely registers 152, 154 respectively), the value read by each of the requesting master devices would be "MD20", which would indicate that master device 20 has control of slave device 12.

Device control process 10 may also set a value for control timer 164. As discussed above, this may be an initial value (e.g., 1,000 milliseconds or 65,535) if control timer 164 is being decremented to zero or an upper limit (e.g., 1,000 milliseconds or 65,535) if counter 164 is being incremented from zero. Further, device control process 10 may set the value of semaphore status register 156 to "MD20", thus indicating that master device 20 currently has control of slave device 12.

Assume for illustrative purposes that master device 20 is performing a standard multi-part operation. For example, while maintaining control of slave device 12, master device 20 wishes to obtain temperature information from slave device 12. Accordingly, master device 20 may write a binary five to data request register 166 included within slave device 12. Upon the binary five being written to data request register 166 by master device 20, slave device 12 may obtain the desired information (i.e., 126 degrees) and write the same to data retrieve register 168. Master device 20 may then read the desired information from data retrieve register 168 of slave device 12. Once this multi-part operation is completed, master device 20 may no longer need to control slave device 12. Accordingly, master device 20 may return control semaphore 162. For example, master device 20 may write a value (e.g., a binary one) to release semaphore register 158. Once master device 20 writes this value to release semaphore register 158, device control process 10 may relinquish control 104 of slave device 12 by master device 20. Device control process 10 may accomplish the process of relinquishing control 104 by writing a generic value (e.g., a binary zero) to each of grab registers 150, 152, 154 and semaphore status register 156 (thus indicating that slave device 12 is no longer under the control of any master device).

Accordingly, by maintaining control of slave device 12 during the entire multi-part operation, the probability of error caused by multiple master devices simultaneously requesting information from e.g., slave device 12 may be greatly reduced.

Continuing with the above-stated example, assume that master device 22 requests and is granted 102 control of slave device 12 by device control process 10. Accordingly, device control process 10 may update the value of grab semaphore register 152 (which would initially be a binary zero at the time of the request) to reflect the identity of master device 22 (e.g., "MD22"). Additionally, device control process 10 may update grab semaphore register 150, 154 (associated with master devices 20, 24 respectively) to also reflect the identity of master device 22 (e.g., "MD22").

As discussed above, when any of master devices 20, 22, 24 requests control of slave device 12, the master device trying to gain control of the slave device may read the grab semaphore register associated with the requesting master device. Accordingly, in the event that either of master devices 20, 24 requests control of slave device 12 (while master device 22 is controlling slave device 12), upon reading the appropriate grab register (namely registers 150, 154 respectively), the value read by each of the requesting master devices would be "MD22", which would indicate that master device 22 has control of slave device 12.

As discussed above, device control process 10 may also set a value for control timer 164, which may be an initial value (e.g., 1,000 milliseconds or 65,535) if counter 164 is being decremented to zero or an upper limit (e.g., 1,000 milliseconds or 65,535) if counter 164 is being incremented from zero. Further, device control process 10 may set the value of semaphore status register 156 to "MD22", thus indicating that master device 22 currently has control of slave device 12.

Assume for illustrative purposes that master device 22 suffers a catastrophic failure. Accordingly, as master device 22 has failed, master device 22 may never return control semaphore 162 and may never write a value (e.g., a binary one) to release semaphore register 158. Accordingly, upon the expiry of control timer 164, device control process 10 may allow another master device to obtain control of slave device 12 and grab semaphore 162. As discussed above, this may be accomplished by having any of the master devices recognize the expiry of control timer 164 and write to release semaphore register 158. After the semaphore is released by this action, the remaining master devices may attempt to grab the semaphore in the normal manor by reading their respective grab register.

During times when e.g., slave device 12 is not under the control of any master device, device control process 10 may allow slave device 12 to grab semaphore 162 (and thus control itself), thus allowing slave device 12 to perform "housekeeping" functions, such as maintenance and diagnostic checks.

Figure 4:
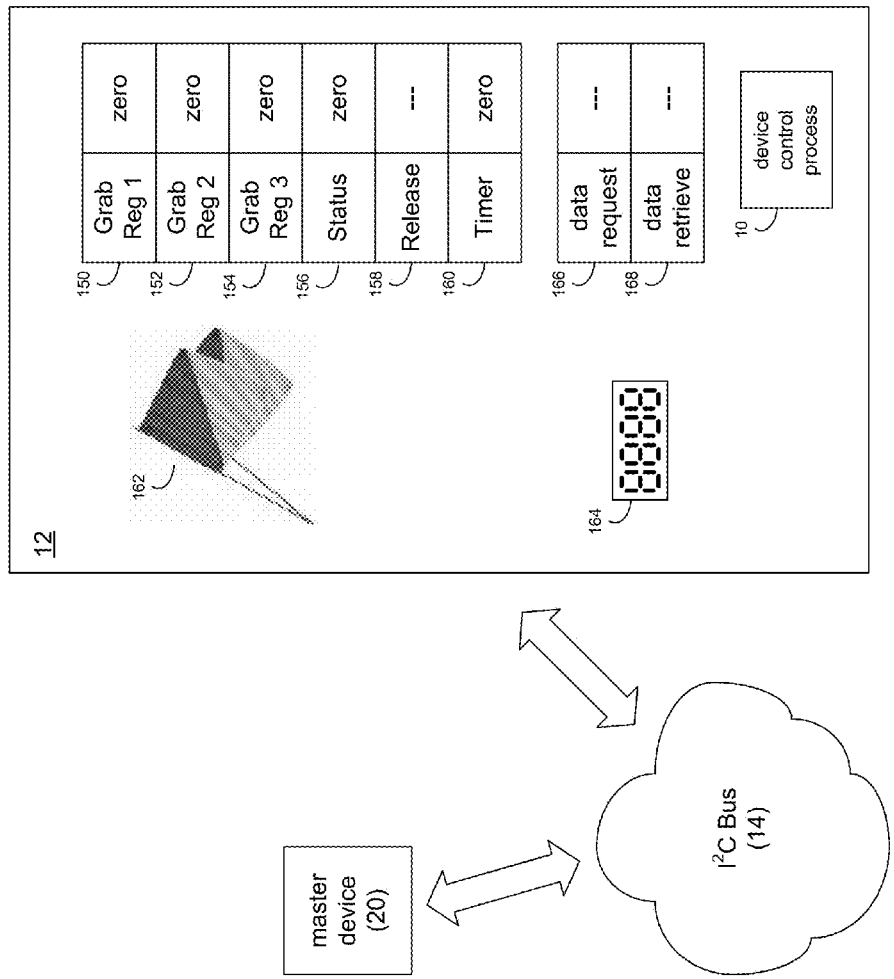
FIG. 4 is another diagrammatic view of the slave device of FIG. 3.

Referring also to FIG. 4, the status of slave device 12 is shown after semaphore 162 is released (i.e., free) and slave device 12 is not under the control of any master device. Specifically, read-only grab semaphore register 150 is shown to have a value of zero; read-only grab semaphore register 152 is shown to have a value of zero; read-only grab semaphore register 154 is shown to have a value of zero; read-only semaphore status register 156 is shown to have a value of zero; and read-only semaphore timer register 160 is shown to have a value of zero.

While semaphore 162 is described above as controlling access of the slave device (e.g., slave device 12) on which semaphore 162 resides, this is for illustrative purposes only, as other configurations are possible and are considered to be within the scope of this disclosure. For example, a semaphore within slave device 12 may be used to control access to another slave device (e.g., slave device 16) if e.g., slave device 16 is an off-the-shelf slave device that does not contain the semaphore feature. Accordingly, provided that device control process 10 and the various master devices are configured appropriately, a semaphore within a first slave device may be used to control access to a second slave device.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

A number of implementations have been described. Nevertheless, it will be understood that various modifications may be made. Accordingly, other implementations are within the scope of the following claims.

What is claimed is:

1. A method of regulating control of a slave device on a communications bus comprising:
   monitoring for requests for control of the slave device by a plurality of master devices;
   granting control of the slave device to one of the plurality of master devices; and
   relinquishing control of the slave device by the one of the plurality of master devices after the occurrence of a relinquishment event, wherein the relinquishment event is an expiry of a control timer during which time the one of the plurality of master devices has control of the slave device, wherein the control timer prevents a failed master device from indefinitely retaining control of the slave driver, wherein the failed master device is unable to relinquish control of the slave device if the failed master suffered a failure while in control of the slave device.

2. The method of claim 1 further comprising one or more of:
setting the control timer to a defined initial value and repeatedly decrementing the control timer until zero; and
setting the control timer to zero and repeatedly incrementing the control timer up to a defined final value.

3. The method of claim 1 wherein the relinquishment event is a return of a control semaphore.

4. The method of claim 1 wherein granting control of the slave device to the one of the plurality of master devices includes the granting of a control semaphore.

5. The method of claim 1 wherein the communications bus is an I$^2$C bus.

6. The method of claim 1 wherein the slave device and the one of the plurality of master devices are I$^2$C devices.

7. A computer program product residing on a computer readable medium having a plurality of instructions stored thereon that, when executed by a processor, cause the processor to perform operations comprising:
monitoring for requests for control of the slave device by a plurality of master devices;
granting control of the slave device to one of the plurality of master devices; and
relinquishing control of the slave device by the one of the plurality of master devices after the occurrence of a relinquishment event, wherein the relinquishment event is an expiry of a control timer during which time the one of the plurality of master devices has control of the slave device, wherein the control timer prevents a failed master device from indefinitely retaining control of the slave driver, wherein the failed master device is unable to relinquish control of the slave device if the failed master suffered a failure while in control of the slave device.

8. The computer program product of claim 7 further comprising instructions for one or more of:
setting the control timer to a defined initial value and repeatedly decrementing the control timer until zero; and
setting the control timer to zero and repeatedly incrementing the control timer up to a defined final value.

9. The computer program product of claim 7 wherein the relinquishment event is a return of a control semaphore.

10. The computer program product of claim 7 wherein the instructions for granting control of the slave device to the one of the plurality of master devices include instructions for the granting of a control semaphore.

11. The computer program product of claim 7 wherein the communications bus is an I$^2$C bus.

12. The computer program product of claim 7 wherein the slave device and the one of the plurality of master devices are I$^2$C devices.

13. A computing system comprising:
at least one processor;
at least one memory architecture coupled with the at least one processor;
a first software module executed on the at least one processor and the at least one memory architecture, wherein the first software module is configured to monitor for requests for control of a slave device on a communications bus by a plurality of master devices;
a second software module executed on the at least one processor and the at least one memory architecture, wherein the second software module is configured to grant control of the slave device to one of the plurality of master devices; and
a third software module executed on the at least one processor and the at least one memory architecture, wherein the third software module is configured to relinquish control of the slave device by the one of the plurality of master devices after the occurrence of a relinquishment event, wherein the relinquishment event is an expiry of a control timer during which time the one of the plurality of master devices has control of the slave device, wherein the control timer prevents a failed master device from indefinitely retaining control of the slave driver, wherein the failed master device is unable to relinquish control of the slave device if the failed master suffered a failure while in control of the slave device.

14. The computing system of claim 13 further comprising a fourth software module executed on the at least one processor and the at least one memory architecture, wherein the fourth software module is configured for one or more of:
setting the control timer to a defined initial value and repeatedly decrementing the control timer until zero; and
setting the control timer to zero and repeatedly incrementing the control timer up to a defined final value.

15. The computing system of claim 13 wherein the relinquishment event is a return of a control semaphore.

16. The computing system of claim 13 wherein granting control of the slave device to the one of the plurality of master devices includes the granting of a control semaphore.

17. The computing system of claim 13 wherein the communications bus is an I$^2$C bus.

18. The computing system of claim 13 wherein the slave device and the one of the plurality of master devices are I$^2$C devices.

* * * * *